M. STOLL.
Improvement in Cultivators.
No. 130,393.                                Patented Aug. 13, 1872.
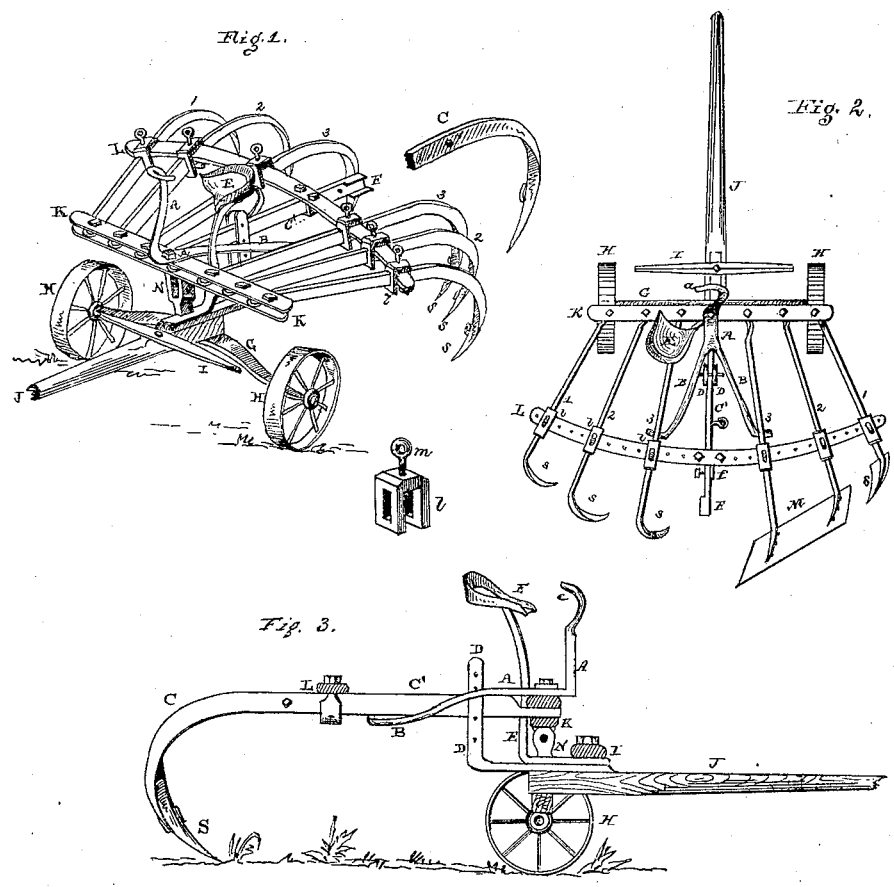
Witnesses.
John D. Mercer
Wm. B. Niley
Inventor.
Michael Stoll,
per J. Stauffer Atty.

UNITED STATES PATENT OFFICE.

MICHAEL STOLL, OF CONESTOGA TOWNSHIP, PENNSYLVANIA.

IMPROVEMENT IN CULTIVATORS.

Specification forming part of Letters Patent No. 130,393, dated August 13, 1872.

Specification describing certain Improvements in Cultivators, invented by MICHAEL STOLL, of Conestoga township, near Slack Water Post Office, in the county of Lancaster and State of Pennsylvania.

This invention relates to a class of cultivators having hinged and adjustable wrought-iron beams, supported in front by a two-wheeled truck. The novelty consists in the application and arrangement of a lever and seat over the truck to enable the farmer to ride and operate the machine, and dispense with the ordinary handles.

In the accompanying drawing, Figure 1 is a perspective view of the machine, showing the central shovel-hook detached. Fig. 2 is a top or plan view of the same; Fig. 3, a central side elevation, to show the relative position of the seat, lever, guide-supports, central beam, and truck arrangement.

I claim no novelty as regards the manner of hinging the shovel-beams 1 2 3 on each side of the center beam C, nor the curved cross-bar L with the adjusting slotted clamps $l$ and setscrew $m$; nor do I claim the two-wheeled truck, as all these have been used substantially in the same manner.

My invention consists in the arrangement and application to this class of cultivators of a lever, A, on the central beam, having branch legs B, which extend back, downward, and outward under the adjoining beams 3, on each side, in order to raise the shovels, either by the foot or hand, when the driver occupies the seat E, by means of said lever A. The central beam C' is also embraced by slotted or open bars D, perforated with a series of holes, for a pin to secure it to any adjustment made. This central beam C, at its end, has a flange or ledge above and below, and a hole for a headed bolt, so that the short crook or central shovel C' can be spliced by inserting between the flanges and screw clamp or holder F, and secured by a headed bolt and nut. Thus, seven shovels are provided to cultivate or work the soil. This central shovel is easily removed when it is desirable to straddle the young corn for working the soil on each side, and by removing the two side shovels 3 2 a scraper, M, with bolt-holes to fit, can readily be applied on each side. Thus it affords all the advantages of the most efficient cultivators. The handles can be dispensed with; and instead of trudging after it in the loose soil—so fatiguing—the farmer can ride and manage the machine as well, much to his comfort, and labor made pleasant and easy.

I am aware there are sulky plows and harrows and various devices in use; but I am not aware that this class of cultivators have ever been provided with a seat, lever, guide, and truck combined substantially in the manner shown and specified; therefore

What I claim as my invention on wrought-iron hook-beamed cultivators is—

The arrangement of the two-armed lever A B, brace and supporting-guide bars D, and seat E, in combination with the center beam C' with its flanged and perforated terminus F, and hinged connection with the axle G of the wheels H, all substantially constructed and operated in the manner and for the purpose specified.

MICHAEL STOLL.

Witnesses:
WM. B. WILEY,
JACOB STAUFFER.